(12) United States Patent
Hotary

(10) Patent No.: US 10,419,868 B2
(45) Date of Patent: Sep. 17, 2019

(54) SOUND SYSTEM

(71) Applicant: Faurecia Automotive Seating, LLC, Auburn Hills, MI (US)

(72) Inventor: James T. Hotary, Holland, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/048,618

(22) Filed: Jul. 30, 2018

(65) Prior Publication Data
US 2019/0045319 A1 Feb. 7, 2019

Related U.S. Application Data

(60) Provisional application No. 62/540,137, filed on Aug. 2, 2017.

(51) Int. Cl.
| | | |
|---|---|---|
| H04S 7/00 | (2006.01) | |
| G06K 9/00 | (2006.01) | |
| H04N 5/33 | (2006.01) | |
| H04R 3/12 | (2006.01) | |
| H04R 5/02 | (2006.01) | |
| H04R 5/04 | (2006.01) | |

(52) U.S. Cl.
CPC .......... *H04S 7/303* (2013.01); *G06K 9/00832* (2013.01); *H04N 5/33* (2013.01); *H04R 3/12* (2013.01); *H04R 5/02* (2013.01); *H04R 5/04* (2013.01); *H04R 2499/13* (2013.01)

(58) Field of Classification Search
CPC .......... H04R 2499/13; H04R 2227/005; H04R 2430/01; H04R 2420/03; H04R 1/1083; H04R 2430/21; H04R 5/04; H04R 2205/024; H04R 5/02; H04R 3/12; H04N 5/33; G10K 2210/128; G10K 2210/1282; G10K 2210/3213; H04S 7/302; H04S 7/30; H04S 7/303; G06K 9/00832
USPC ... 381/302, 389, 86, 56, 102–109, 123, 119, 381/365, 303
See application file for complete search history.

(56) References Cited

U.S. PATENT DOCUMENTS

| | | | |
|---|---|---|---|
| 9,277,343 B1* | 3/2016 | Alexandrov | ............ H04S 1/002 |
| 2007/0127734 A1* | 6/2007 | Brulle-Drews | ........ H04B 1/207 |
| | | | 381/86 |
| 2011/0175718 A1* | 7/2011 | Inoue | ..................... B60Q 5/008 |
| | | | 340/463 |
| 2014/0376737 A1* | 12/2014 | Goldman | ............ H04M 1/6066 |
| | | | 381/80 |
| 2018/0206036 A1* | 7/2018 | Laack | ................ G06K 9/00288 |

* cited by examiner

*Primary Examiner* — Norman Yu
(74) *Attorney, Agent, or Firm* — Barnes & Thornburg LLP

(57) ABSTRACT

A vehicle includes an interior cabin space and a sound system. The sound system includes one or more speakers and sensors configured to change sounds emitted from the speakers.

20 Claims, 2 Drawing Sheets

SOUND SYSTEM

PRIORITY CLAIM

This application claims priority under 35 U.S.C. § 119(e) to U.S. Provisional Application Ser. No. 62/540,137, filed Aug. 2, 2017, which is expressly incorporated by reference herein.

BACKGROUND

The present disclosure relates to a sound system, and particularly a sound system for a vehicle. More particularly, the present disclosure relates to a sound system including one more speakers and sensors.

SUMMARY

According to the present disclosure, a vehicle includes an interior cabin space and a sound system. The sound system includes one or more speakers and sensors configured to change sounds emitted from the speakers.

In illustrative embodiments, the sound system may be configured audible intelligence to vehicle occupants in the cabin space based on sounds sensed inside and outside of the vehicle. The sound system may include a sensor configured to detect sounds inside and outside the vehicle, a sensor configured to detect a position of a person in the vehicle, and a plurality of speakers. In some illustrative embodiments, the sensor may be one or more microphones. The sound system includes an audible content management system configured to prioritize and output sounds detected inside and outside the vehicle to a person in the vehicle by categorizing the sounds according to the position of the person and a predetermined priority of the sound associated with the position of the person and selecting at least one of the plurality of speakers to send a signal to based on the position of the person in order to output a notification to the person.

In illustrative embodiments, the audible content management system is further configured to categorize sounds that are of relatively low priority compared to a relatively high priority categorized sound and send anti-content signals to at least one of the plurality of speakers to attenuate the low priority sound signal. In illustrative embodiments, the sensor comprises a plurality of sensors positioned in the vehicle interior and on the vehicle exterior.

In illustrative embodiments, the system includes one or more mobile devices and the audible content management system is activated in response to detection of a mobile device in proximity to the content management system. The plurality of speakers of the system includes the mobile device and a plurality of speakers located in a cabin of the vehicle.

In illustrative embodiments, the audible content manager is configured to prioritize and output notifications for a plurality of detected people at a plurality of different locations in the vehicle. The sensor for detecting a position comprises at least one infrared camera to detect the head or ear position of a person in the vehicle.

According to an embodiment, a method for controlling sound content in a vehicle comprises sensing a person in proximity to vehicle and activating an audible content management system in response. The method includes sensing sounds internal or external to the vehicle to establish sensed sounds, processing the sensed sounds and a detected position of the person in the vehicle in order to categorize, prioritize, and filter the sensed sounds, and outputting a notification to a speaker in the vehicle.

In illustrated embodiments, the method includes attenuating sounds categorized as relatively low priority compared to a relatively high priority categorized sound by sending anti-content signals to the speaker to be output in the notification. The method also includes amplifying a sound categorized as relatively high priority by activating the speaker and adjusting the decibel level of the relatively high-priority sound to be output in the notification.

In illustrated embodiments, the position of the person in the vehicle is sensed by an infrared camera detecting the person's head or ear orientation and location within a cabin of the vehicle. A person is sensed to be in proximity to the vehicle when a wireless connection is established between a wireless connection means of the vehicle and a mobile device.

In illustrated embodiments, the speaker is one of a vehicle speaker or a mobile device speaker, and the speaker is selected based on the position of the person in the vehicle. The audible content manager is configured to prioritize and output notifications for a plurality of detected people at a plurality of different locations in the vehicle.

In illustrated embodiments, a sound system for a vehicle comprises a sensor configured to detect sounds inside or outside the vehicle, a sensor configured to detect a position of a person in the vehicle, and an audible content management system. The audible content management system is configured to prioritize and output notifications based on the sounds detected inside and outside the vehicle to a person in the vehicle by categorizing the sounds according to the position of the person and a predetermined priority of the sound associated with the position of the person and selecting at least one visual or audible outputting means to send a signal to based on the position of the person in order to output a notification to the person.

In illustrated embodiments, the visual or audible output means comprises a display in the vehicle or one or more speakers in the vehicle. The audible content management system may distinguish between emergency sounds detected from audio or video content inside the vehicle and emergency sounds detected external to the vehicle. In response to emergency sounds detected external to the vehicle, sounds detected inside the vehicle may be muted, cancelled, or lowered. In response to emergency sounds detected from audio or video content inside the vehicle, the output notification may be a signal that there is no emergency.

In illustrative embodiments, the system may include or more mobile devices, wherein the audible content management system is activated in response to detection of a mobile device in proximity to the content management system.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
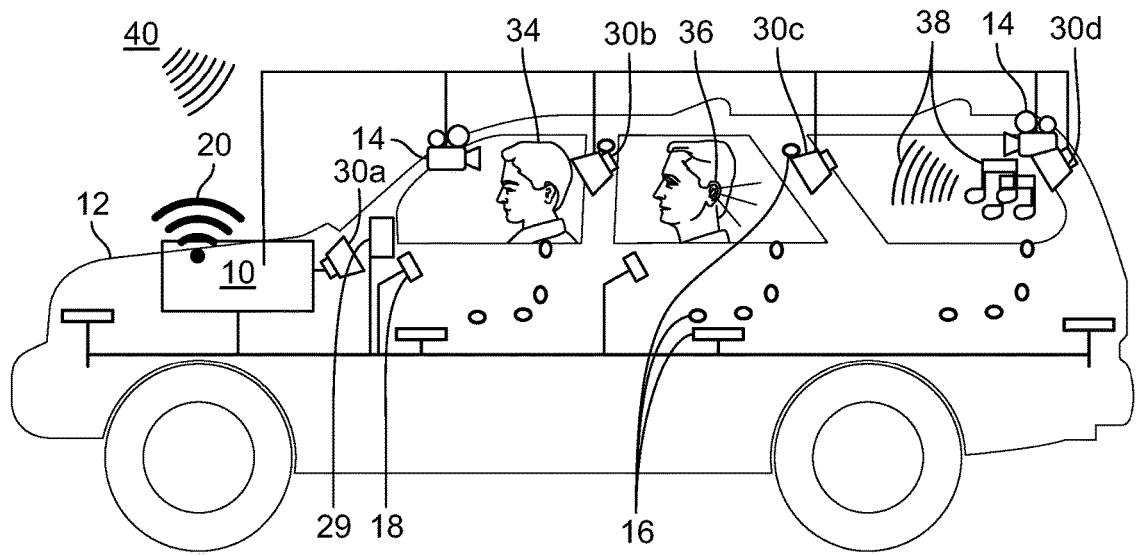
FIG. 1 is a side perspective view of a passenger vehicle showing a driver seated in front of a rear passenger, and diagrammatically shows a sound system with internal and external sensors inputting to an audible content management system as well as a plurality of speakers arranged in the vehicle to output notifications.

A sound system for controlling the audible content heard by occupants 34, 36 of a vehicle 12 is provided as shown in FIG. 1. The vehicle 12 includes a plurality of sensors 18 to detect sounds inside the vehicle and sensors 16 to detect sounds outside of the vehicle, one or more sensors 14 to detect occupants and their positions in the vehicle 12, and an audible content management system 10 to receive and process the detected sounds and detected occupants. Sound detection sensors 18, 16 may include, for example, directional microphones. Position-detecting sensors 14, may include weight sensors or camera sensors for example, infrared camera sensors, as well as geolocation systems such as GPS 40 that detect occupant position 34 as well as where the occupant's facial features, particularly ears, mouth, or eyes are positioned in the vehicle 12.

Audible content management system 10 is configured to process the sounds detected by sensors and detected occupant positions to output commands or signals to infotainments outputs 29, 30a-30d to provide notifications to the occupants. Infotainment outputs including one or more displays 29 and speakers 30a-30d, which are coupled to the audible content manager 10 to output notifications to occupants 34, 36 based on the sounds sensed by the sensors 18, 16 and the detected occupants. Near-field speaker and microphone applications may be used such as Faurecia's OASIS wrap-around headrest. Flexible speaker and other vibrating elements may also be used as part of the infotainment output. Audible content manager 10 may further include wireless communication means 20, such as WiFi, BlueTooth™ or any other wireless communications protocol to communicate with the components of the system 10, and further with occupant mobile devices 42 as discussed with respect to FIG. 2.

Figure 2:
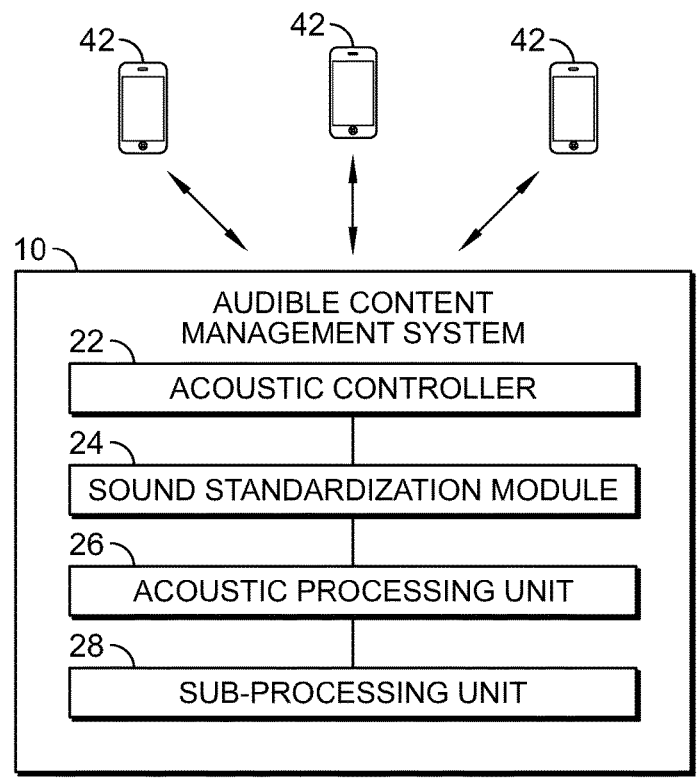
FIG. 2 is a diagrammatic view of an audible content management system and additional mobile devices that may be in communication with the audible content management system in the vehicle.

As seen in FIG. 2, audible content management system 10 includes a sub-processing unit 28, an acoustic processing unit 26, a sound standardization module 24, and an acoustic controller 22. Sub-processing unit 28 is configured to identify sound signals picked up by and transmitted from internal and external sensors 16, 18, or sensors on mobile device 42.

Acoustic processing unit 26 is configured to categorize and prioritize the identified sounds with respect to each occupant identified in the vehicle for internal and external situational awareness. For example, a detected ambulance siren may be categorized as an emergency sound. This siren may be given higher priority with respect to a vehicle driver than with respect to the back seat. Another identified sound, a detected passenger vocal, may be categorized as a speech sound. The speech sound category may be given lower priority to the emergency sound category for the vehicle driver and may be cancelled for the back seat vehicle passenger who provided the passenger vocal. Another identified sound, a detected internal radio, may be categorized as music sound. The music sound may be given a lower priority to the emergency sound for the vehicle driver, but a higher priority than the emergency sound for the back seat vehicle passenger. Generally speaking, important external sounds such as people in close proximity to the vehicle or emergency vehicles may be given greater priority to occupants such as drivers to increase situational awareness.

Sound standardization mode 24 may comprise one or more software layers for filtering and standardization of sounds or normalization of a notification to a user. For example, with respect to the driver, the music may be set to be a much lower volume than a notification of the siren. Anti-content or noise cancellation may be developed to cancel out the speech sounds. With respect to the passenger, music may be given higher priority with current sound level maintained or raised, whereas the emergency sound notification may be set to be relatively quieter or even silent, and relayed as a visual notification on one of the displays.

Acoustic controller 22 activates final signal processing to each occupant. Depending on the location of infotainment outputs and the orientation of each occupant's head or ears, acoustic controller 22 will activate one or more particular speakers 30a-30d, 42 at the determined decibel level to allow the occupant to receive the desired notification. Anti-content signals at other speakers may also be generated and output to prevent other occupants from hearing a notification. Notifications may include, for example, an alert describing the direction a siren is coming from, noise cancellation or anti-content signals, reduction in volume of audible content, enhanced exterior noises, including exterior vocals, processor-generated word and sentence notifications, and LED, HUD, and touchscreen color, shape, and written notifications.

As shown in FIG. 2, mobile devices 42 may be integrated into the system 10 through wireless or plugged in hardwire communication. Mobile device 42 may be a smartphone and provide each of an in-vehicle sound sensor via an integrated microphone, an in-vehicle speaker via an integrated speaker, a display for outputting audible content via an integrated display, and an occupant position sensor via an integrated GPS. Mobile device 42 may act as a trigger to begin receiving audible content in audible content management system 10 in response to a connection established between mobile device 42 and the audible content management system 10. Audible content management system 10 is configured to use geolocation based on the mobile device 42 to target where the occupant's ear is, supplementing geolocation with occupant head and ear position and orientation information derived from infrared camera 14.

In one example, when a call is answered by an occupant, all other noises or voices may be attenuated by the audible content management system 10 so that the occupant on the mobile device is not distracted by them and does not hear them. Additionally, audible content management system 10 may amplify or focus the voice of the person calling the occupant to be output through one or more speakers, as well as the voice of the occupant who is talking to the caller, as sensed by the internal sensors 18, 42.

Figure 3:
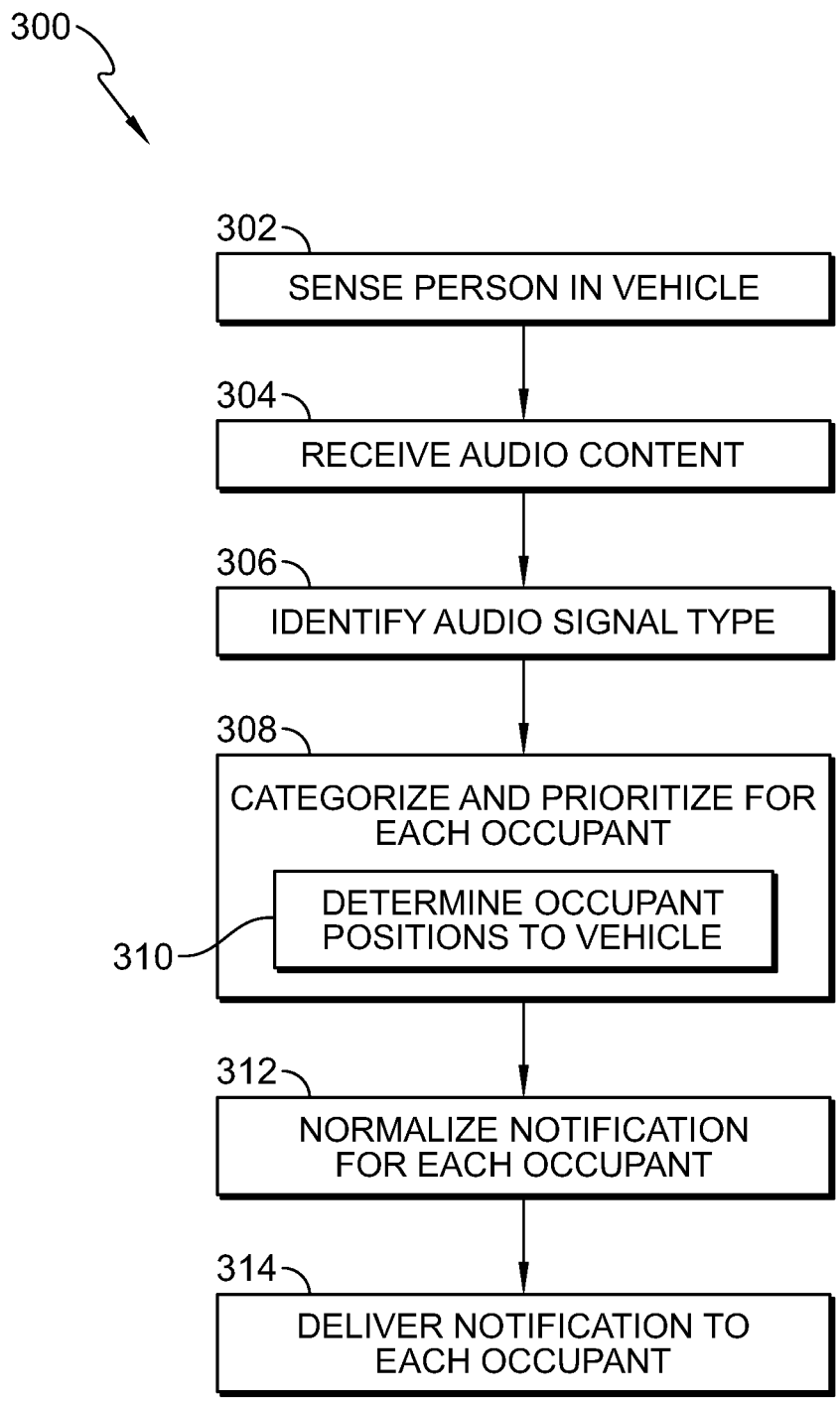
FIG. 3 is a block diagram of a process performed by the audible content management system to control sound content within the vehicle.

A method for prioritizing and delivering audio content to an occupant in a vehicle 300 is provided in FIG. 3. A person is sensed in the vehicle 302 including at least their position in the vehicle, such as driver seat, front seat, and rear seat passengers and orientation of facial features including mouth and ears. In some embodiments, the person may be sensed to be approaching or entering a vehicle via a connection being established between the person's mobile device and the audible content management system of the vehicle. This can trigger other position sensors such as the occupant detection sensors inside the vehicle to begin sensing. Once an occupant is sensed to be inside the vehicle cabin, audio content including but not limited to, noise, alarms, voices, music, and other audio sources and media, are received by the audible content management system from sensors positioned in the vehicle cabin and on the vehicle exterior. Each received audio signal is identified 306 and then may be categorized and prioritized 308 according to a pre-programmed set of categories and their relative priorities for each occupant position in the vehicle. It is further determined which occupant positions in the vehicle are occupied 310 based on the sensing of the occupant in the vehicle. In this manner, audio sources detected inside the cabin, such as conversation or media may be directed to everyone in the vehicle or only between select people in the vehicle.

Audio signals may be further prioritized based on occupant facial feature positions. For example, it may be determined that a vehicle driver is trying to listen to a back seat passenger based on an angle of the driver's head, and therefore the passenger vocals may be given greater priority than it otherwise would. An overall notification for each occupant occupying a position in the vehicle is normalized 312. For example, each of the audio signals may be attenuated via noise filtering, noise-cancelling or anti-content signals, or may be amplified to enhance the signal. In one example, the physical locations of the speakers and sensors may be used to filter noise signals.

Normalization may further include complete override. For example, for drivers speaking to children sitting in second and third row seats in the rear of the vehicle watching movies or listening to music, the media content may be muted while the driver's voice is amplified. Likewise emergency vehicle sirens, or other emergency situations such as detection of a person behind the vehicle may be amplified and override other audio content. Then each notification is delivered to each occupant via one or more speakers that are selected based on the position and orientation of the occupant 314. In this manner, there are no outputs to empty seats in the vehicle.

Furthermore, lower priority audible content may be noise-cancelled, delayed, output at a lower decibel level, or output as a visual indicator such as an LED light, HUD display, or other vehicle or mobile device screen display. By way of another example, a song playing inside the vehicle may include a siren that sounds like an emergency vehicle. The system may process this sound and simply output a green light, indicating to the occupant that everything is okay and there is no external emergency vehicle approaching.

Some or all of the methodology explained above may be performed on, or with access to one or more servers, processors and associated memory. Unless specifically stated otherwise, and as may be apparent from the above description, it should be appreciated that throughout the specification descriptions using terms such as "processing," "computing," "calculating," "determining," or the like, refer to the action and/or processes of a computer or computing system, or similar electronic computing device, that manipulate and/or transform data represented. In a similar manner, the terms "controller," "module," and "unit" may refer to a processor or any device or portion of a device that processes electronic data from registers and/or memory to transform that electronic data into other electronic data that may be stored in registers and/or memory.

The invention claimed is:

1. A sound system for a vehicle comprising: a first sensor configured to detect sounds inside or outside the vehicle, a second sensor configured to detect a position of a person in the vehicle, a plurality of speakers, and an audible content management system configured to prioritize and output sounds detected inside and outside the vehicle to a person in the vehicle by categorizing the sounds according to the position of the person and a predetermined priority of the sound associated with the position of the person and selecting at least one of the plurality of speakers to send a signal to based on the position of the person in order to output a notification to the person.

2. The sound system of claim 1, wherein audible content management system is further configured to categorize sounds that are of relatively low priority compared to a relatively high priority categorized sound and send anti-content signals to at least one of the plurality of speakers to attenuate the low priority sound signal.

3. The system of claim 1, wherein the first sensor comprises a plurality of sensors positioned in the vehicle interior and on the vehicle exterior.

4. The system of claim 1, further comprising one or more mobile devices, wherein the audible content management system is activated in response to detection of a mobile device in proximity to the content management system.

5. The system of claim 4, wherein plurality of speakers includes the mobile device and a plurality of speakers located in a cabin of the vehicle.

6. The system of claim 1, wherein the audible content manager is configured to prioritize and output notifications for a plurality of detected people at a plurality of different locations in the vehicle.

7. The system of claim 1, wherein the sensor for detecting a position comprises at least one infrared camera to detect the head or ear position of a person in the vehicle.

8. A method for controlling sound content in a vehicle comprising:
   sensing a person in proximity to vehicle with a first sensor and activating an audible content management system in response,
   sensing sounds internal or external to the vehicle with a second sensor to establish sensed sounds,
   processing the sensed sounds and a detected position of the person in the vehicle with a processor,
   categorizing the sounds according to the position of the person and a predetermined priority of the sounds associated with the position of the person, and
   outputting a notification to a speaker in the vehicle based on the position of the person.

9. The method of claim 8, further comprising attenuating sounds categorized as relatively low priority compared to a relatively high priority categorized sound by sending anti-content signals to the speaker to be output in the notification.

10. The method of claim 9, further comprising amplifying a sound categorized as relatively high priority by activating the speaker and adjusting the decibel level of the relatively high-priority sound to be output in the notification.

11. The method of claim 8, wherein the position of the person in the vehicle is sensed by an infrared camera detecting the person's head or ear orientation and location within a cabin of the vehicle.

12. The method of claim 8, wherein a person is sensed to be in proximity to the vehicle when a wireless connection is established between a wireless connection means of the vehicle and a mobile device.

13. The method of claim 8, wherein the speaker is one of a vehicle speaker or a mobile device speaker, and the speaker is selected based on the position of the person in the vehicle.

14. The method of claim 8, wherein the audible content manager is configured to prioritize and output notifications for a plurality of detected people at a plurality of different locations in the vehicle.

15. A sound system for a vehicle comprising a first sensor configured to detect sounds inside or outside the vehicle, a second sensor configured to detect a position of a person in the vehicle, and an audible content management system configured to prioritize and output notifications based on the sounds detected inside and outside the vehicle to a person in the vehicle by categorizing the sounds according to the position of the person and a predetermined priority of the sound associated with the position of the person and selecting at least one visual or audible outputting means to send a signal to based on the position of the person in order to output a notification to the person.

16. The sound system of claim 15, wherein the visual or audible output means comprises a display in the vehicle or one or more speakers in the vehicle.

17. The sound system of claim 15, wherein the audible content management system is configured to distinguish between emergency sounds detected from audio or video content inside the vehicle and emergency sounds detected external to the vehicle.

18. The sound system of claim 17, wherein in response to emergency sounds detected external to the vehicle, sounds detected inside the vehicle are muted, cancelled, or lowered.

19. The sound system of claim 17, wherein in response to emergency sounds detected from audio or video content inside the vehicle, the output notification comprises a signal that there is no emergency.

20. The system of claim 15, further comprising one or more mobile devices, wherein the audible content management system is activated in response to detection of a mobile device in proximity to the content management system.

* * * * *